(12) United States Patent
Jacobson

(10) Patent No.: US 7,020,598 B1
(45) Date of Patent: Mar. 28, 2006

(54) NETWORK BASED DIAGNOSTIC SYSTEM AND METHOD FOR SOFTWARE RECONFIGURABLE SYSTEMS

(75) Inventor: Neil G. Jacobson, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 883 days.

(21) Appl. No.: 09/968,439

(22) Filed: Oct. 1, 2001

Related U.S. Application Data

(63) Continuation-in-part of application No. 09/823,154, filed on Mar. 29, 2001.

(51) Int. Cl.
G06F 17/50 (2006.01)
G06F 9/455 (2006.01)
G06F 9/44 (2006.01)
G06F 19/00 (2006.01)
G01R 15/00 (2006.01)

(52) U.S. Cl. .................. 703/14; 703/23; 717/168; 717/169; 717/170; 717/171; 717/172; 717/173; 702/57; 702/58

(58) Field of Classification Search .............. 703/14, 703/23; 717/168–173; 702/57, 58
See application file for complete search history.

(56) References Cited

U.S. PATENT DOCUMENTS

| | | | |
|---|---|---|---|
| 5,109,353 A | 4/1992 | Sample et al. | |
| 5,463,638 A | 10/1995 | De Lange | |
| 5,535,406 A | 7/1996 | Kolchinsky | |
| 5,684,980 A | 11/1997 | Casselman | |
| 5,737,497 A | 4/1998 | Ballard | |
| 5,794,033 A | 8/1998 | Aldebert et al. | |
| 5,802,290 A | 9/1998 | Casselman | |
| 5,841,867 A | 11/1998 | Jacobson et al. | |
| 5,983,378 A | 11/1999 | De Wit et al. | |
| 5,995,744 A * | 11/1999 | Guccione | 703/23 |
| 6,023,565 A | 2/2000 | Lawman et al. | |
| 6,047,128 A * | 4/2000 | Zander | 717/173 |
| 6,074,432 A | 6/2000 | Guccione | |
| 6,078,736 A | 6/2000 | Guccione | |
| 6,112,020 A | 8/2000 | Wright | |
| 6,119,256 A | 9/2000 | De Jong et al. | |

(Continued)

FOREIGN PATENT DOCUMENTS

WO WO 99/23588 5/1999

OTHER PUBLICATIONS

M. Nolan, J. P. Goirdano, "Use of Adaptive Model-Based Reasoning for Embedded Diagnostics and Redundancy Mangement for Fault Tolerant Systems", IEEE 1997, pp. 455-466.*

(Continued)

*Primary Examiner*—Paul L. Rodriguez
*Assistant Examiner*—Dwin M. Craig
(74) *Attorney, Agent, or Firm*—Peter Kraguljac; LeRoy D. Maunu

(57) ABSTRACT

A system and method for diagnosing a software system within a remote electronic device using a network is provided. A diagnostic controller controls diagnostics of the software system by instructing the remote electronic device to replace a selected software component of the software system with a diagnostic software component. The diagnostic software component has equivalent operational characteristics as the selected software component and includes trace logic that collects diagnostic data while operating with the software system. An analysis routine analyzes the diagnostic data and recommends a corrective measure for the software system.

20 Claims, 11 Drawing Sheets

U.S. PATENT DOCUMENTS

| | | | |
|---|---|---|---|
| 6,134,707 | A | 10/2000 | Herrmann et al. |
| 6,144,933 | A | 11/2000 | Guccione |
| 6,167,319 | A | 12/2000 | Harris et al. |
| 6,195,774 | B1 | 2/2001 | Jacobson |
| 6,205,579 | B1* | 3/2001 | Southgate .................. 717/173 |
| 6,226,779 | B1 | 5/2001 | Baxter et al. |

OTHER PUBLICATIONS

M. Inaba, T. Aizono, K. Sonobe, H. Fukube, T. Iizumi, J. Arima, Y. Usami, "The Development of Security System and Visual Service Support Software for On-Line Diagnostics" IEEE 2001 pp. 45-48.*

N. H. M. Caldwell, B.C. Brenton, D. M. Holburn, "Remote Instrument Diagnosis on the Internet" IEEE 1998, pp. 70-76.*

Nicola Mazzocca, Stefano Russo and Valeria Vittorini, "Integrating Trace Logic and Petri Nets Specifications" ISBN 0-8186-7862-3, IEEE 1997, 9 pages.*

Neil G. Jacobson, "Internet Reconfigurable Logic, Leveraging PLD's to Enhance Embedded System Functionality", presented at Embedded Internet Workshop, Xilinx Inc., 2100 Logic Drive, San Jose, CA 95124, Oct. 1, 1999, pp. 1-9.

Richard Sevcik, "Internet Reconfigurable Logic", Apr. 1999, found at www.xilinx.com/xilinxonline/irlwpaper.htm, pp. 1-6.

Thomas Branca et al., "Remote Field Updates Using FPGAs", 1999, found at www.xilinx.com/xilinxonline/remote_wp.htm, pp. 1-9.

* cited by examiner

NETWORK BASED DIAGNOSTIC SYSTEM AND METHOD FOR SOFTWARE RECONFIGURABLE SYSTEMS

FIELD OF THE INVENTION

The invention relates generally to diagnostic and repair systems. It will be appreciated that the invention finds particular application to a system and method for diagnosing software components of a remote electronic device and repairing defective software over a network.

BACKGROUND OF THE INVENTION

A programmable logic device is a digital integrated circuit capable of being programmed after its manufacture to provide a variety of different logic functions. Examples include a programmable logic device (PLD) and a field programmable gate array (FPGA). A PLD generally includes 'AND' gates, 'OR' gates, and Input/Output buffers, and functions differently depending on how it is programmed. An FPGA includes a gate array of logic elements (or macrocells), either gates or lookup table RAMs, flip-flops and programmable interconnect wiring. Typical FPGAs are reprogrammable since their logic functions and interconnects are defined by RAM cells. While a typical PLD may contain hundreds of gates, an FPGA may contain tens of thousands of logic elements.

Programming a PLD or FPGA is achieved using on-chip fuses, EPROM (UV erasable programmable read-only memory) circuits, EEPROM (electrically erasable programmable read-only memory) circuits, and RAM (random access memory) circuits which programmably create data paths and logic functions within the device that are specific to a user's design.

State of the Art PLDs make use of one or more nonvolatile memory cell arrays (e.g. EPROM, EEPROM, Flash EPROM, or Flash EEPROM) so that they can retain their configuration memory during power-down. Typically, these arrays are erasable, thereby allowing the desired functionality of the PLD to be re-programmed many times. This programmability makes a PLD family a flexible and powerful tool for a large number of unique applications where a common PLD is employed and only the chip's internal programming is varied.

Programmable logic devices are common in many electronic devices such as cellular phones, personal digital assistants, network switching equipment, etc. Although the PLDs are easily configured, it is difficult to diagnose and reconfigure them once they are embedded in the electronic device and in a user's possession. To perform a diagnostic test involves transporting the device to a repair center or having a technician make an on-site test. This is time consuming for the user and potentially expensive.

Electronic devices typically operate with a software system. When problems occur in the software, it has been difficult to identify problems and diagnose them. With prior devices, the device needed to be physically taken to a service center or diagnosed on-site by a skilled technician.

The present invention provides a new and unique system and method for diagnosing and reconfiguring software that cures the above-referenced problems and others.

SUMMARY OF THE INVENTION

According to one embodiment of the present invention, a diagnostic system for diagnosing a software system operating within a remote electronic device where the software system includes one or more software components is provided. It includes a network communication interface that establishes communication to the remote electronic device. A diagnostic controller controls diagnostics of the software system where the diagnostic controller instructs the remote electronic device to replace a selected software component of the software system with a diagnostic software component, which is transmitted to the remote device via the network communication interface. The diagnostic software component has equivalent operational characteristics as the selected software component and includes trace logic that collects diagnostic data while operating with the software system. An analysis routine then analyzes the diagnostic data and recommends a corrective measure for the software system.

According to another aspect of the present invention, a process of diagnosing a software system within a remote electronic device is provided. A diagnostic software component is transmitted to the remote electronic device that emulates operational characteristics of a software component within the software system. The electronic device is instructed to operate with the diagnostic software component in place of the software component. The diagnostic software component collects operational data transmitted between the diagnostic software component and other components of the electric device. The operational data is then received and analyzed to diagnose defects in the software system.

One advantage of the present invention is that an electronic device that is installed in the field or in a user's possession can be diagnosed remotely using a network.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Signals", as used herein, includes but is not limited to one or more signals, one or more computer instructions, a bit stream, an algorithm, a routine, a program or the like. The term "commands" is synonymous with "signals."

"Software", as used herein, includes but is not limited to one or more computer executable instructions, routines, algorithms, modules or programs including separate applications or from dynamically linked libraries for performing functions and actions as described herein. Software may also be implemented in various forms such as a stand-alone program, servlet, applet or other type of application.

"Logic", as used herein, includes but is not limited to hardware, software and/or combinations of both to perform a function.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software.

"Intranet", as used herein, includes a data communications network similar to an internet but typically having access restricted to a specific group of individuals, organizations, or computers.

Figure 1:
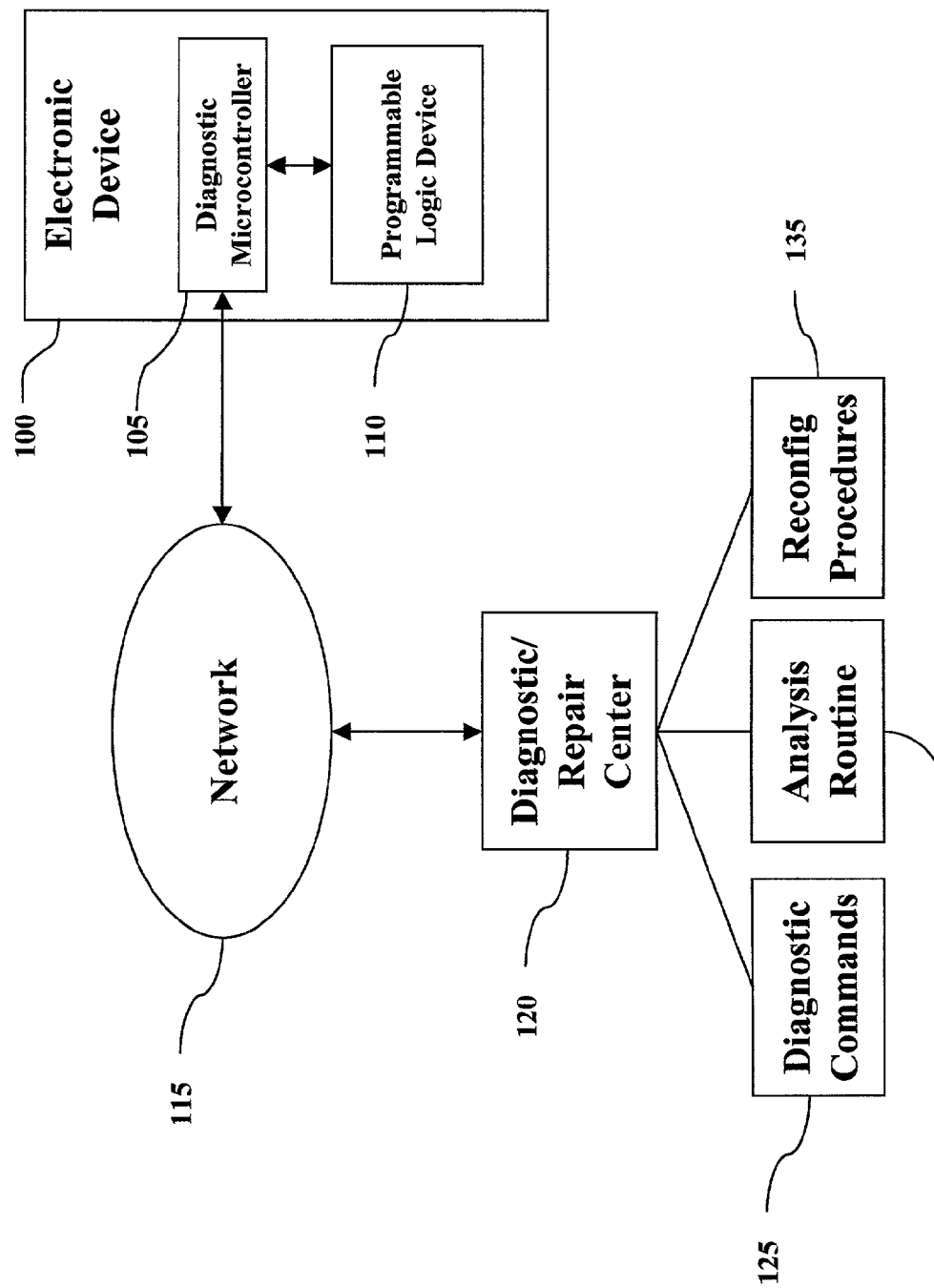
FIG. 1 is an exemplary system diagram in accordance with the present invention.

Illustrated in FIG. 1 is an exemplary overall system for diagnosing an electronic device 100 installed in the field or in a user's possession in accordance with the present invention. The electronic device 100 includes an embedded diagnostic microcontroller 105 that is configured to access and communicate to one or more programmable logic devices 110 within the electronic device 100. The microcontroller 105 includes logic that establishes and controls communication to a communication network 115. With an established connection to the network 115, communication is established with a diagnostic/repair center 120 and a diagnostic request is made.

After receiving the diagnostic request, the diagnostic/repair center 120 transmits diagnostic commands 125 to the microcontroller 105 from a remote location. The diagnostic microcontroller 105 then initiates diagnostic tests on the programmable logic device 110, or other components, to test its functionality. Results from the tests are collected and transmitted back to the diagnostic/repair center 120. An analysis routine 130 analyzes the results and determines if the programmable logic device 110 is functioning properly. If errors are found, corrective actions are taken which may include reconfiguring the programmable logic device 110 based on reconfiguration commands 135 transmitted by the diagnostic/repair center 120.

In one embodiment, the electronic device 100 is a self-contained product that is built with the features of the present invention thereby converting it to a remotely diagnosable/reconfigurable product. Exemplary electronic devices 100 include consumer products such as mobile telephones, wired telephones, pagers, personal digital assistants, computers, and the like. They also include larger systems, typically non-consumer products, such as communication switches, routers, gateways, firewalls, digital cellular base stations, line cards, PBX's, radio equipment, satellites and any other device that includes programmable logic devices.

The diagnostic/repair center 120 is a technical service computer center with one or more computers operated by technicians to facilitate diagnostics and repairs of a remote electronic device 100. It will be appreciated that the diagnostic/repair center can also be fully automated if desired. The diagnostic commands 125 of the diagnostic/repair center 120 include, for example, a database of test vectors, test signals, test algorithms and the like. In general, they are signals to be sent to the programmable logic device 110 for probing and/or stimulating it to generate output signals representative of a configuration and functionality of the programmable logic device 110. One or more diagnostic commands are associated for a selected electronic device 100 based on its type, e.g. manufacturer, model, serial number, etc. and/or based on the type of programmable logic devices contained within the electronic device. The technician can also generate custom diagnostic commands to accommodate a given situation.

The diagnostic commands 125, for example, can include any well known built-in self-test (BIST) based strategies for testing individual devices. This involves realizing test logic in the programmable logic device capable of verifying the correct functionality of the elements within the logic device. Other types of diagnostic commands include reconfiguration signals that configure one section of the programmable logic device to be responsible for the generation and application of a test stimulus to another section of the device under test. Other tests include using the INTEST instruction and the boundary-scan register in the logic device, or the RUNBIST instruction, test logic and a boundary-scan register. These and other tests are well known in the art.

Figure 2:
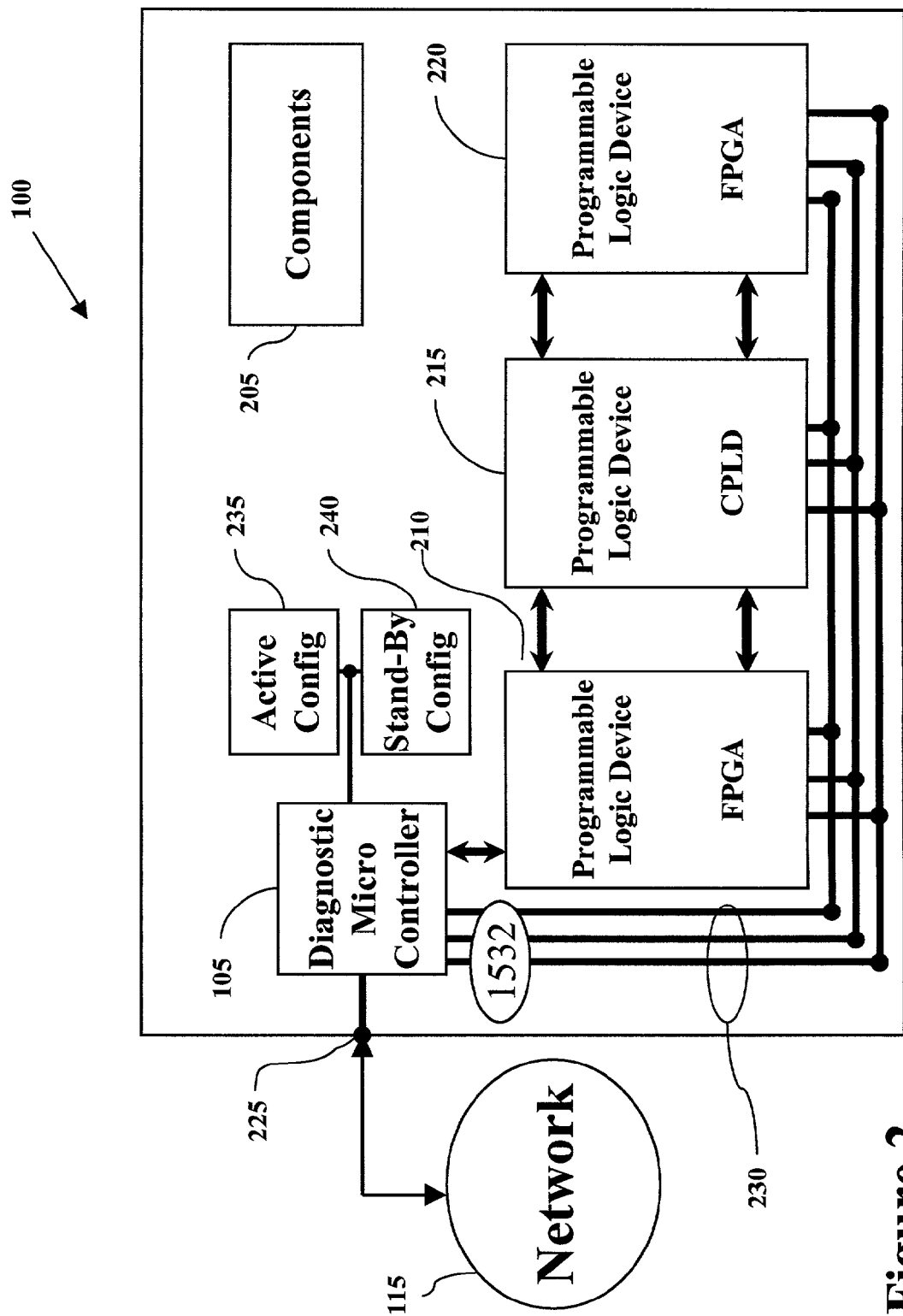
FIG. 2 is an exemplary component diagram of an electronic device in accordance with the present invention.

Illustrated in FIG. 2 is an exemplary component diagram of the electronic device 100 that is diagnosable and repairable over a communication network according to one embodiment of the present invention. Depending on the type of electronic device, it may include a plurality of components 205 that perform desired functions of the device. The electronic device 100 also includes one or more programmable logic devices (PLD), for example, PLD's 210, 215 and 220. As is known in the art, a programmable logic device is any device having configurable logic linked together via programmable interconnect. Memory cells control and define functions that the logic performs and how the functions are interconnected. For exemplary purposes, the programmable logic devices in the illustrated embodiment include FPGA's 210 and 220 (field programmable gate arrays) and a CPLD 215 (complex programmable logic device). Of course, other programmable logic devices may be used and may be configured and connected in any desired manner.

With further reference to FIG. 2, the diagnostic microcontroller 105 communicates to the network 115 through an external communication port 225 formed on the exterior of the electronic device 100 through a wire connection. It will be appreciated that wireless communication components can also be used in addition to or in place of the port 225 as is known in the art. To communicate to components within the electronic device 100, an internal communications bus 230 is connected to selected components, for example, to the programmable logic devices 210, 215 and 220. This connectivity and structure is designed when the electronic device is built. In this manner, the diagnostic microcontroller 105 has access to the programmable logic devices to perform diagnostic tests and, if necessary, reconfigure their logic. Of course, communications bus 230 can have any number of signal lines.

In one embodiment, the diagnostic microcontroller 125, the communications bus 230, and the programmable logic devices 210, 215 and 220 comply with IEEE Standard 1532. IEEE Standard 1532 describes a series of mandatory and optional programming instructions and associated data registers that define a standard methodology for accessing and configuring programmable devices. By using 1532- compliant devices, the configuration of the device, or chains of devices, is well defined functionally, behaviorally and algorithmically which simplifies communications to the device. Being compliant with IEEE Standard 1532 also requires compliance with the IEEE Standard 1149.1 communication protocol (commonly known as the boundary-scan standard or JTAG). Details of IEEE Standards can be found from the Internet at www.standards.ieee.org. Alternately, other standards may be used as is known in the art or as they become available. If no standard is used, a custom methodology would be configured and programmed for a specific electronic device to perform the communications to programmable logic devices.

With further reference to FIG. 2, an active configuration memory 235 stores current configuration settings for the programmable logic devices 210, 215 and 220 connected to the diagnostic microcontroller 105. A stand-by configuration memory 240 is provided to store new configuration settings that are to replace some or all of the configuration settings in the active configuration memory 235 in response to reconfiguration instructions. This will be described in greater detail below.

The memories 235 and 240 are the type that do not lose their contents when power is turned off. Exemplary memories include flash memory, other non-volatile memory types, a memory card, or the like. It will be appreciated that the active and stand-by configuration memories may be internal or external to the diagnostic microcontroller 105. The two memories can also be implemented as separate spaces or partitions within a single memory device. Their contents may be swapped, for example, by changing active pointers or addresses.

Figure 3:
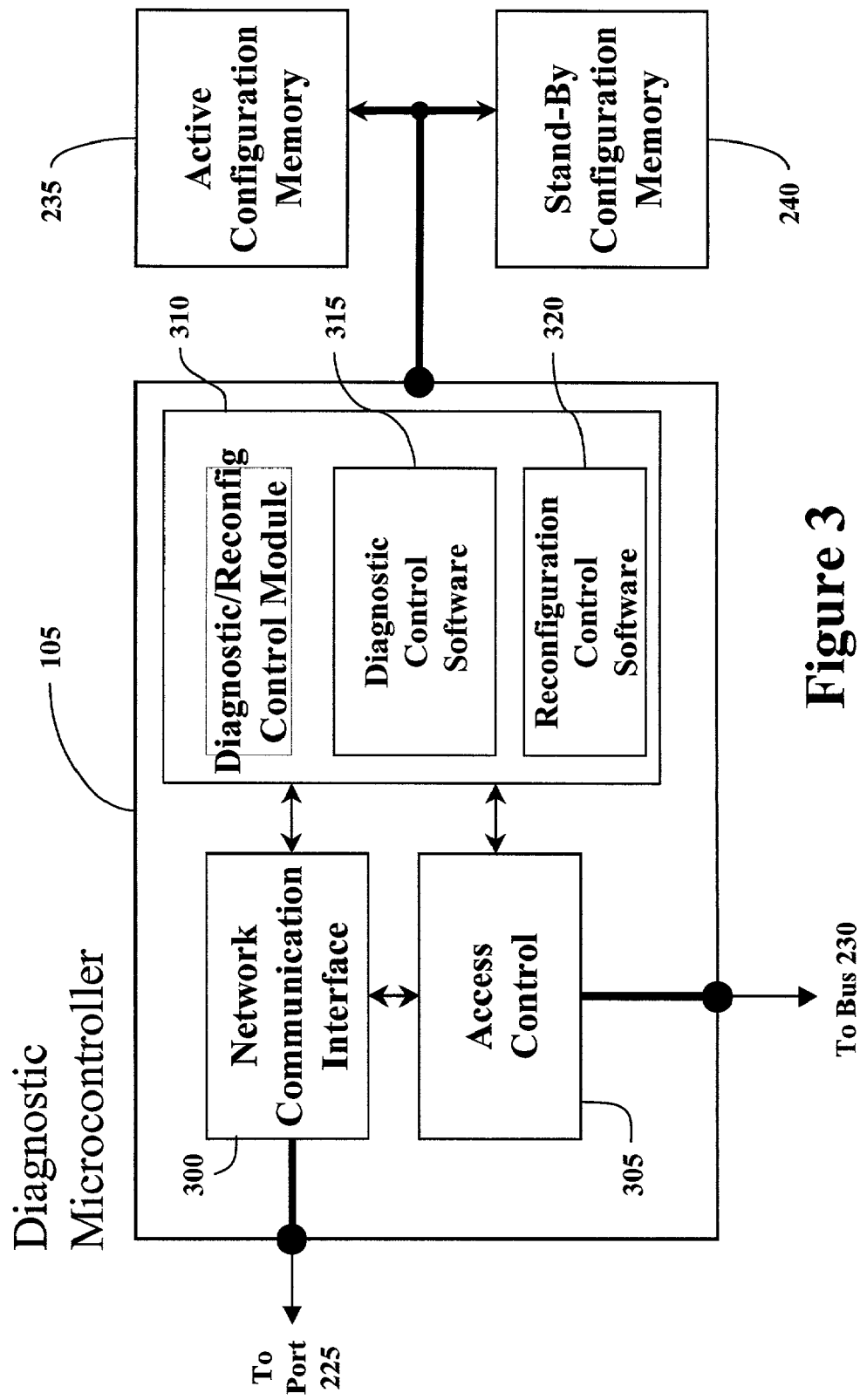
FIG. 3 is an exemplary component diagram of a diagnostic microcontroller shown in FIG. 2 in accordance with the present invention.

Illustrated in FIG. 3 is an exemplary embodiment of the diagnostic microcontroller 105 in accordance with the present invention. The diagnostic microcontroller 125 is, for example, a microprocessor operating under software control. One example is an 8-bit 8051 microprocessor that is an off-the-self product configured to have logic and programmed to perform functions including communicating with the network 115, communicating to components within the electronic device 100, controlling diagnostic tests, and reconfiguring programmable logic devices based on the diagnostic tests. Alternately, the microcontroller 125 is implemented using discrete logic and circuitry for performing these functions.

With further reference to FIG. 3, for communicating with the network 115, the diagnostic microcontroller 125 includes a network communication interface 300 in communication with the external communication port 225 of the electronic device 100. The network communication interface 300 controls communication between the microcontroller 105 and the network 115. The interface 300 includes, for example, logic for establishing a communication link and logic for transmitting and receiving signals in accordance with the type of network 115 being connected to and its communication protocol. Once communication with the network is established, the communication interface 300 communicates with the diagnostic control center 120 also connected to the network 115.

It will be appreciated that certain electronic devices 100 include standard network communication features. For example, a cellular phone with Internet access. In this case, the diagnostic microcontroller 105 can be modified to use those standard network communication features rather than its network communication interface 300 or even not include the interface 300.

For communicating with components within the electronic device 100, the diagnostic microcontroller 125 includes an access control module 305. The access control module 305 includes logic for communicating to and from the internal communication bus 230 and the programmable logic devices 210, 215 and 220 connected thereto. For example, implementing IEEE Standard 1532, 4–5 pins on the diagnostic microcontroller 105 are connected to corresponding signal lines on the internal communication bus 230. On the programmable logic device, the bus 230 is connected to at least configuration and test ports as described by IEEE Std 1532 and 1149.1.

In response to instructions from the diagnostic microcontroller 105, the access control module 305 transmits diagnostic signals to one or more of programmable logic devices 210, 215, and 220 to test their functionality and collects result signals outputted from the programmable logic devices. When implementing compliance with IEEE Standard 1149.1, which may or may not also include implementing IEEE Standard 1532, the access control module 305 includes logic for communicating to the programmable logic device to control the boundary scan logic.

With further reference to FIG. 3, the diagnostic microcontroller 105 includes a diagnostic/reconfiguration control module 310 which includes diagnostic control software 315 and reconfiguration control software 320. The diagnostic control software 315 includes logic that controls diagnostic processes performed on selected programmable logic devices. The reconfiguration control software 320 includes logic that controls reconfiguration processes performed on selected programmable logic devices. These processes are described in greater detail below.

Figure 4:
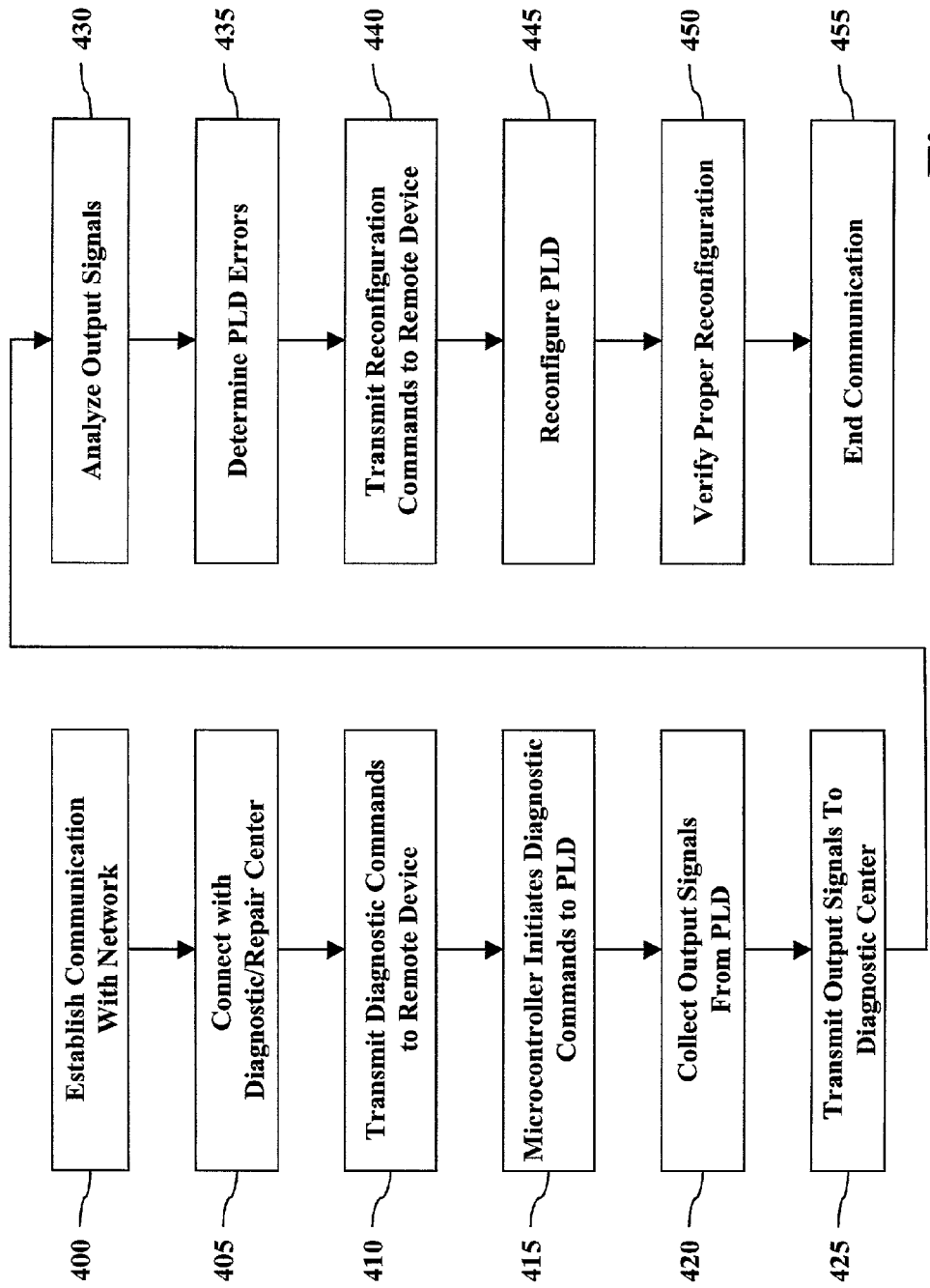
FIG. 4 is an exemplary process diagram of a remote diagnostic procedure in accordance with the present invention.

Illustrated in FIG. 4 is an overall exemplary methodology of the system shown in FIG. 1 for diagnosing a remote electronic device 100, and if appropriate, reconfiguring selected programmable logic devices 110 therein. AS illustrated, the blocks represent functions, actions and/or events performed therein. It will be appreciated that electronic and software applications involve dynamic and flexible processes such that the illustrated blocks can be performed in other sequences different than the one shown.

For the following exemplary description, an exemplary electronic device 100 is a personal digital assistant (PDA) and the network 115 is the Internet. References are made to FIGS. 1 and 4. Suppose a user has a PDA 100 that seems to be functioning incorrectly. The PDA 100 includes the diagnostic microcontroller 105 and associated communication architecture and features as described above. To initiate a remote diagnosis of the PDA, a connection is established to the network 115 using a direct line or wireless link (block 400). Communication is then established with the diagnostic/repair center 120 (block 405) which identifies the PDA, for example, by model number, serial number, manufacturer, etc. Based on the identification, diagnostic commands 125 are retrieved and transmitted to the diagnostic microcontroller 105 (block 410).

The diagnostic control software 315 of the microcontroller 105 receives the diagnostic commands via the network communication interface 300. The diagnostic commands are then initiated to test one or more target programmable logic devices 210, 215, and 220 (block 415). This includes transmitting the diagnostic commands onto the internal communication bus 230 where they are inputted to a selected target device being tested. In response, the target programmable logic device generates one or more output signals. The output signals are captured and collected (block 420) from the internal communication bus 230 by the diagnostic control software 315.

With further reference to FIGS. 1 and 4, the collected output signals are transmitted to the diagnostic/repair center 120 (block 425). The analysis routine 130 analyzes the output signals to determine if the programmable logic device under test is configured properly and/or functioning properly (block 430). The analysis evaluates the behavior of the target device under test represented by the output signals, and determines if the behavior is correct, reflective of a known error, or reflective of an unknown error (block 435). For example, this is performed by comparing the output signals received to a correct set of signals that are expected from corresponding input signals (e.g. from the diagnostic commands used).

The analysis may also include comparing the output signals with a predetermined set of output signals that are the result of known errors. In other words, known errors in a configuration will have a certain behavior and produce a certain set of output signals for a given set of input signals. Thus, if the error is known in advance, it can be detected in a remote electronic device by comparing its output signals and/or behavior to the known set of error output signals. The evaluation may include input from a technician at the diagnostic/repair center 120 assisting with the diagnosis.

If a hardware error is found that is a known problem and/or if the error is repairable by reconfiguration, reconfiguration commands 135 are transmitted back to the diagnostic microcontroller 105 (block 440). For example, the reconfiguration commands include a configuration bit stream. The reconfiguration commands 135 may be a predetermined set of reconfiguration signals associated with a known problem, or might be generated by the technician looking at the diagnostic output or by modifying predetermined reconfiguration signals for a given situation. The commands 135 can also be driven by the analysis routine 130 evaluating the diagnostic output that determines the next course of action.

Once the reconfiguration commands are received, the reconfiguration control software 320 initiates reconfiguration of the target programmable logic device in accordance with known configuration procedures for logic devices (block 445). As a safety measure, the reconfiguration commands are loaded in the stand-by configuration memory 240 and verification is made that the reconfiguration commands were fully and properly received from the network. After verification, the commands are moved to the active configuration memory 235.

After reconfiguration, verification is made to ensure the reconfiguration was correctly performed (block 450). If no further errors were found, the communication with the network is ended (block 455).

If a software error is found during the analysis of output signals at block 435, a software update is transmitted to the diagnostic microcontroller 105. Software errors may include defective or outdated system software and/or application software that is running on the electronic device. This presumes that a software update is available. The software update is loaded by the diagnostic microcontroller 105 into the electronic device 100, re-booted, and the diagnostic commands are re-run to determine if the errors were corrected.

If an error is found that is not repairable by the diagnostic/repair center 120, a message is sent indicating that the electronic device 105 should be returned for repair. This may include transmitting a kill signal that disables the electronic device 100 so that the user is forced to return the device.

In some cases, the analysis routine 130 and or technician will conclude that the diagnostic output signals received are indeterminate and additional diagnostics are required. Here, reconfiguration commands 135 are used to reconfigure the target device under test in order to run additional diagnostics to determine what caused the original output signals. For example, some or all of the device under test is configured such that it has an expected behavior. Then, tests are run to determine if it behaves properly. By repeating this, portions of logic can be isolated and tested to identify problems.

Figure 5:
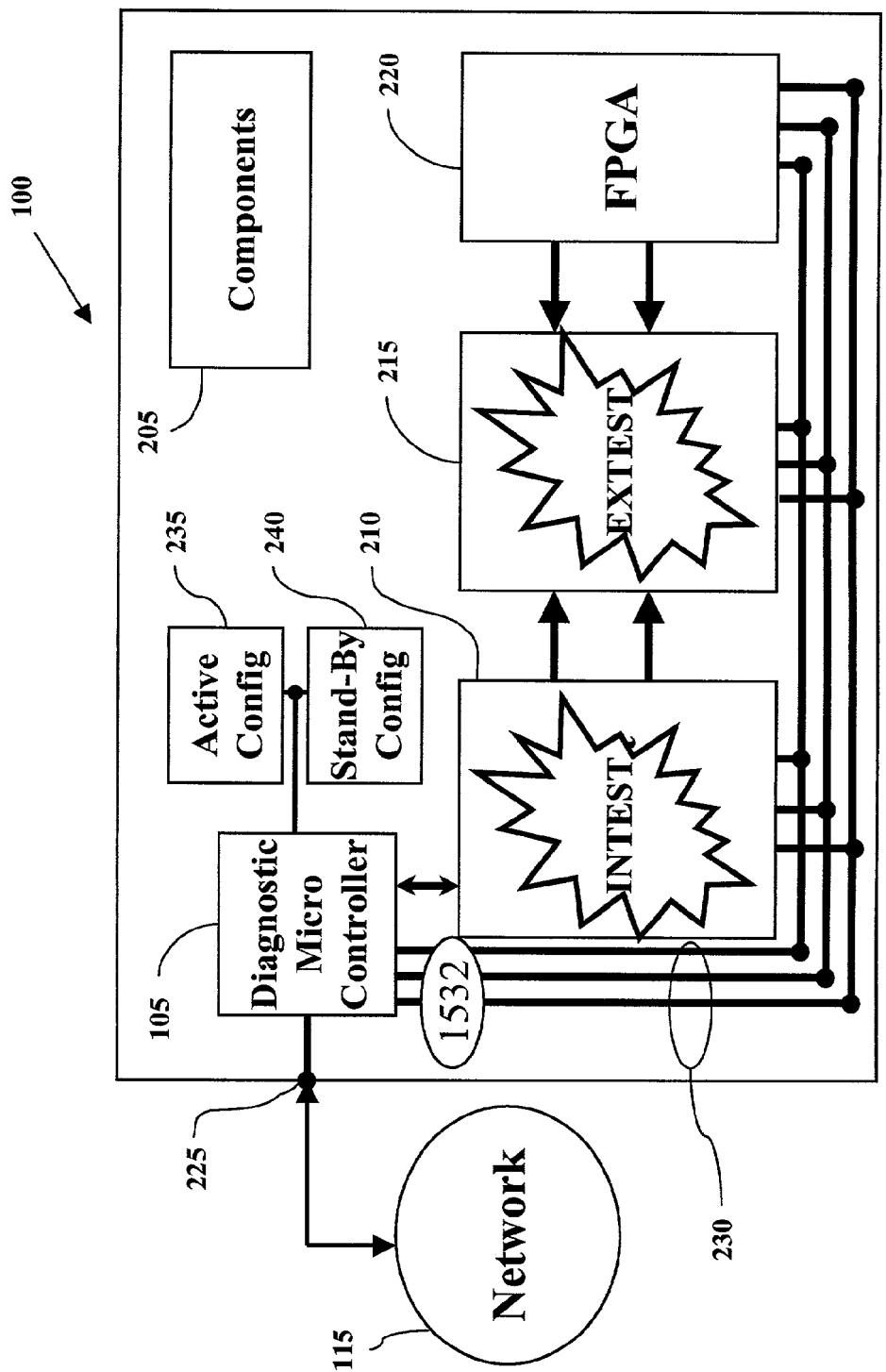
FIG. 5 is an exemplary component diagram of FIG. 2 representing a diagnostic test performed.

Illustrated in FIG. 5 is an exemplary representation of the electronic device 100 shown in FIG. 2 having diagnostic commands performed therein. In particular, FIG. 5 represents an INTEST and EXTEST performed therein. These tests are based on the programmable logic devices 210 and 215 having boundary-scan logic of IEEE Std 1149.1. In this example, diagnostic commands received from the diagnostic/repair center 120 include instructions to activate INTEST and EXTEST, respectively, to diagnose the associated devices. INTEST tests internal logic of a device and EXTEST tests the logic of an adjacent/neighboring device or system logic. These tests can be performed independent of each other. During an EXTEST, diagnostic commands include boundary scan signals that cause a programmable logic device to drive test stimulus signals to one or more neighboring devices.

Figure 6:
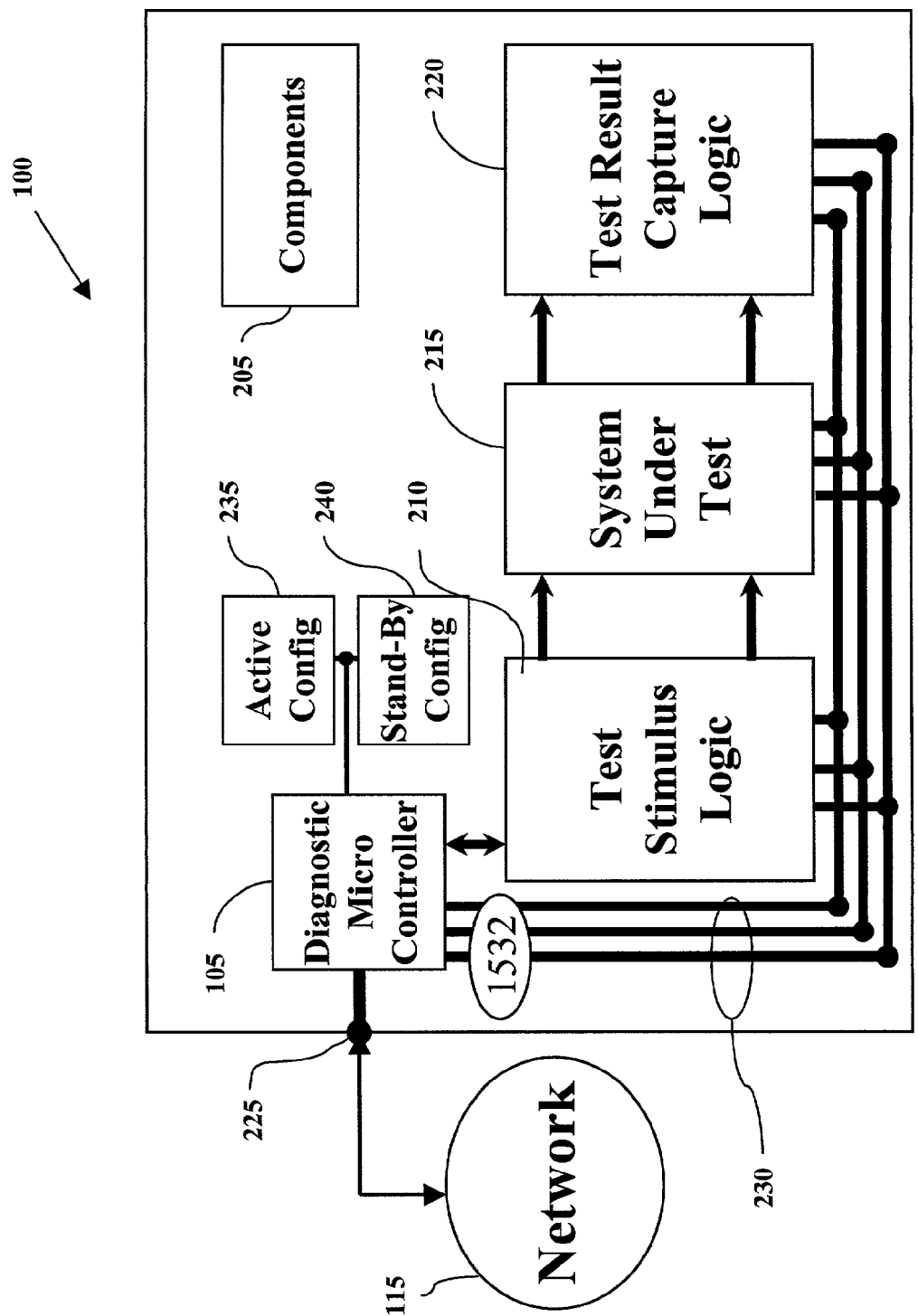
FIG. 6 is an exemplary component diagram of FIG. 2 representing another diagnostic test performed.

Illustrated in FIG. 6 is another exemplary representation of the electronic device 100 shown in FIG. 2 having diagnostic commands performed therein. In particular, diagnostic commands reconfigure a selected programmable logic device 210 to act as a test stimulus device that generates and drives test signals for input to one or more neighboring devices under test 215. The diagnostic commands may also reconfigure another programmable logic device to act as a test result capture device 220 to capture output from the device under test 215. In this sense, the diagnostic commands are reconfiguration commands that are processed by reconfiguration logic within the reconfiguration control software 320. Devices 210 and 220 are, for example, IEEE Std 1532 compliant devices and the device under test 215 can be any type, including a non-programmable logic device, for example, an ASIC chip.

In the example of FIG. 6, the test stimulus device 210 generates test stimulus signals that are inputted to the device under test 215. In response thereto, the device under test generates output signals. The test result capture device 220 then captures the output signals and transmits them to the diagnostic microcontroller 105. The output signals are then transmitted to the diagnostic/repair center 120 for analysis. If the device under test 215 is non-configurable, diagnostic results can be sent back but no repairs will be made.

By leveraging programmability and the possibility of performing the programming via the four (4) wire 1149.1 Test Access Port (TAP), system testability can be enhanced. It is similar to taking typical single device built-in self-test (BIST) approach and breaking it into its constituent parts then reassembling those parts in a system. This is accomplished through the creation of such standard test constructs as multiple input shift registers, linear feedback shift registers or other signature collection and calculation registers.

In addition, random or deterministic test vector generators and controlled frequency oscillators can be realized. These represent basic building blocks of system test. So applying the single device test and basic BIST mechanisms allows incorporation of BIST into the system without paying additional hardware costs. The 1532 compliant devices can be utilized for other mission functions after the BIST operations are complete. In addition, the BIST functionality can be recovered by reprogramming the 1532 devices.

The Xilinx family of FPGAs incorporates two user-available boundary-scan instructions. These can be utilized by system designers to implement special purpose boundary-scan triggered and controlled functionality. These two instructions (USER1 and USER2) are natural building mechanisms for the operation of the system BIST functions.

The presence of boundary-scan logic on any of the devices within the electronic device 100 in general also provides another possible resource that can be used. For instance, the SAMPLE instruction can be used to sample system signals at arbitrary times without interfering with the operation of the system BIST logic. In addition, the HIGHZ, CLAMP and EXTEST instructions could be used to drive and hold arbitrary values on system control pins and disable or enable system busses.

The following is a description of the hardware and functional elements in an IEEE Std 1532 compliant device that can be used for the present invention. IEEE Std 1532 is built on the foundation of IEEE Std 1149.1. This means that a 1532 compliant device must first be 1149.1 compliant. Upon that foundation, 1532 requires that the programmable device has well-defined externally observable behavior before, during and after the configuration process. To that end, the standard mandates how the configurable pins of the programmable device will behave at all times. In addition, it specifies when and how these pins will take on their programmed state.

System I/O pins of a 1532 compliant device have behavior summarized as follows:

If an In-System Configurable (ISC) instruction is loaded, the system I/O pins take on either HIGHZ-like or CLAMP-like behavior according to the design of the device.

If an IEEE Std 1149.1 test mode instruction (EXTEST, INTEST, RUNBIST, CLAMP, HIGHZ) is loaded, the system I/O pins are controlled as defined by that standard.

If an IEEE Std 1149.1 non-test mode instruction (BYPASS, IDCODE, USERCODE, SAMPLE, PRELOAD) is loaded in the instruction register, the system I/O pin behavior is determined what ISC operation was being performed when the instruction was loaded.

When an IEEE Std 1149.1 non-test mode instruction is loaded in an ISC device, there is a choice of behaviors for the system I/O pins. These are summarized as follows:

If the device is in the unprogrammed state, the system I/O pins are disabled.

If the device is performing an ISC operation, the system I/O pins take on either HIGHZ-like or CLAMP-like behavior according to the design of the device.

If the device is in the programmed and operational state, the system I/O pins operate as determined by the programming of the device.

A 1532 compliant device may have both ISC pins and fixed pins. In this case, the ISC pins behave as described above but the fixed pins behave according to the function of the core to which they are connected.

Figure 7:
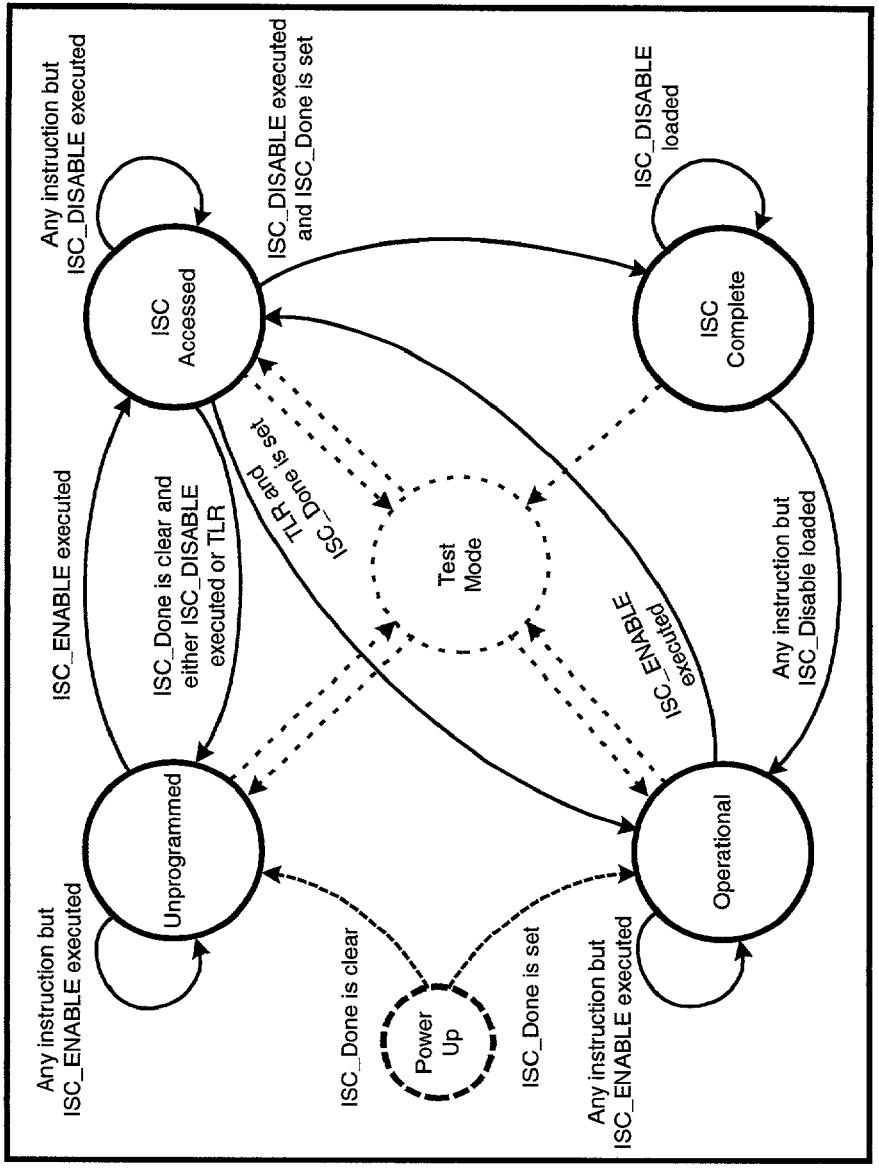
FIG. 7 is an exemplary state diagram of a programmable logic device that is compliant with IEEE Standard 1532.

With reference to FIG. 7, an illustration of four modal states of operation for an IEEE Std 1532 device are shown including the conditions for transition between the states. The states and transitions of a typical In-System Configurable (ISC) device are well defined by the standard. The standard defines four system modal states that correspond to the described states. The modal states include:

(1) Unprogrammed: In this system modal state, an ISC programmable logic device may be blank or incompletely programmed.

(2) ISC Accessed: In this system modal state, ISC instructions may be used to read, write, verify, protect or erase the device.

(3) ISC Complete: This system modal state exists so that an external algorithm can control transitions to the Unprogrammed or operational system modal states after ISC operations are complete.

(4) Operational: In this system modal state, the device is ready for its "operational" mode defined by its programming.

In order to configure a 1532 compliant device, a sequence of ISC instructions and data are loaded into the device. ISC operations are executed when the Test Access Port (TAP) controller is transitioned to a Run-Test/Idle State. In a simple implementation, an exemplary sequence of operations includes:

1. Load ISC_ENABLE instruction.
2. Load data associated with ISC_ENABLE instruction.
3. Transition to and stay in the Run-Test/Idle TAP controller state for the prescribed amount of time.

This completes the device's preparation to begin performing ISC operations. The device's programmable system pins take on either a HIGHZ'ed or CLAMP'ed state.

4. Load the ISC_ERASE instruction.
5. Load data associated with the ISC_ERASE instruction.
6. Transition to and stay in the Run-Test/Idle TAP controller state for the prescribed amount of time.

The above sequence erases the programmed contents of the device's configuration memory. Additional iterations through steps 5 and 6 may be required if the device has multiple sectors to erase.

7. Load the ISC_PROGRAM instruction.
8. Load the configuration data associated with the ISC_PROGRAM instruction.
9. Transition to and stay in the Run-Test/Idle TAP controller state for the prescribed amount of time.
10. Repeats steps 8 and 9 until the device's configuration memory has been completely programmed.

The above sequence loads the programmable device's configuration memory with the designed pattern.

11. Load the ISC_DISABLE instruction.
12. Transition to and stay in the Run-Test/Idle TAP controller state for the prescribed amount of time.

The above sequence marks the completion of the loading of the program pattern in the device's configuration memory. When the ISC_DISABLE instruction is displaced from the device's instruction register, the device will be operational. To accomplish this, the next step may be executed, the device should be operational and the system pins take on their programmed behaviors:

13. Load the BYPASS instruction.

With the present invention, electronic devices having programmable logic can be diagnosed and possibly repaired remotely using a network connection. This eliminates having to physically transport the electronic device to a repair center or having a technician make an on-site visit.

Figure 8:
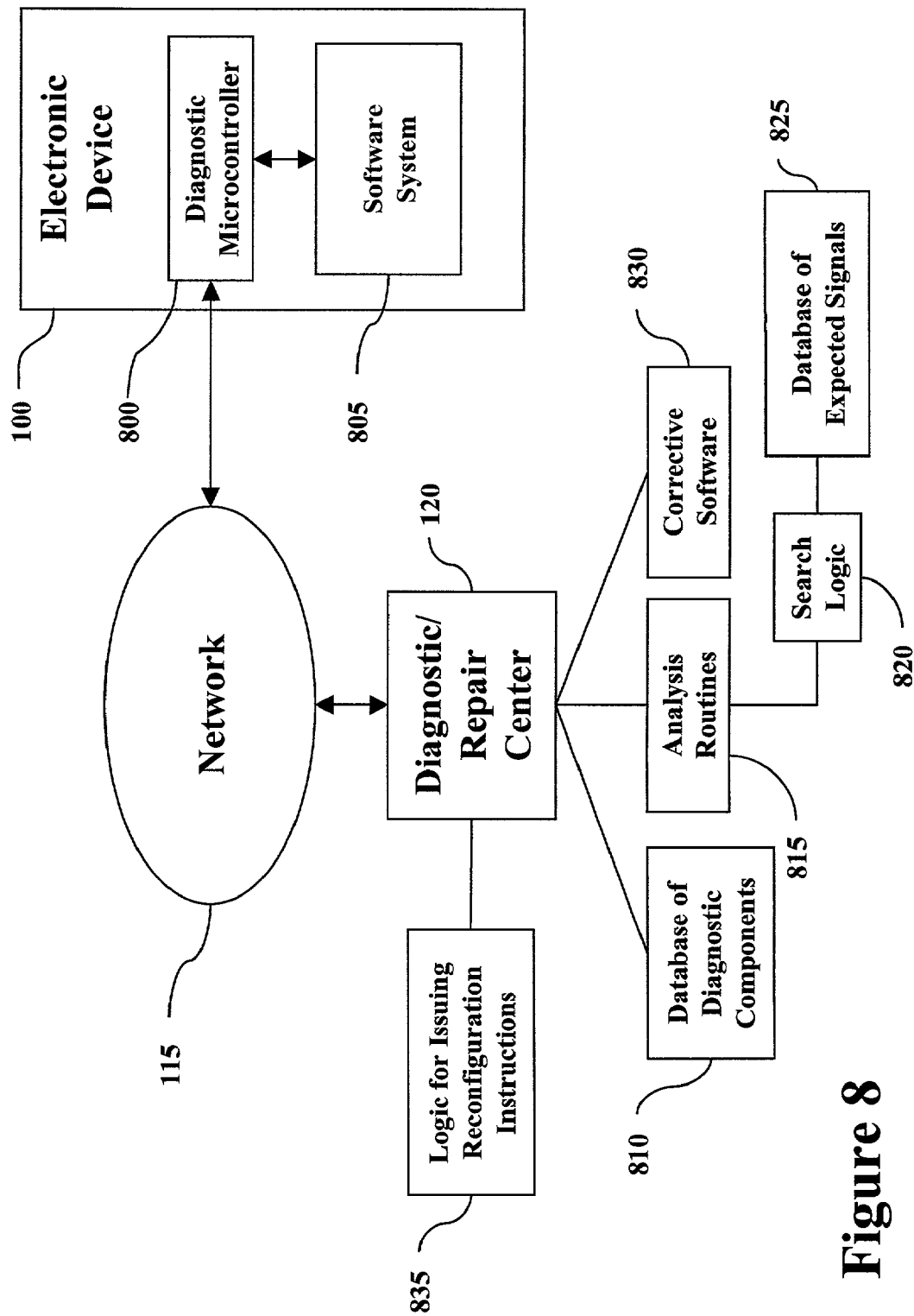
FIG. 8 is an exemplary system diagram for diagnosing software in accordance with another embodiment of the present invention.

Illustrated in FIG. 8 is an exemplary overall system diagram of a system that diagnoses and repairs software of the remote electronic device 100 in accordance with another embodiment of the present invention. The electronic device 100 includes an embedded diagnostic microcontroller 800 that is similar to the microcontroller 105 but is configured to access and communicate with system software 805 of the electronic device. To briefly describe the system, the diagnostic/repair center 120 establishes communication with the diagnostic microcontroller 800 over the network 115 allowing the diagnostic center 120 to observe the symptoms and behavior of the electronic device. Based on the observed behavior and/or comments from the user of the electronic device 100, a diagnostic software component is selected from a database of diagnostic software 810 and is installed in the software system 805 of the electronic device replacing an existing software component.

The electronic device is then operated with the diagnostic software component. During operation, the diagnostic software component emulates the replaced component and captures operational data. This data includes actual input and output results and/or other signals communicated to and from the diagnostic software component. The operational data is then transmitted back to the diagnostic center 120 for analysis. One or more analysis routines 815 analyze the operational data to determine possible defects or bugs in the software system 805. A diagnostic technician can also review the operational data to identify any problems in the software's behavior if desired. The analysis can include comparing a set of observed signals from the operational data to a set of expected signals known for the component. This includes having search logic 820 to locate corresponding signals in a database of expected signals 825. Based on the analysis, a decision is made whether additional testing is required, whether a fix is available for the observed behavior from an available set of associated corrective software 830, or whether the problem cannot be fixed through a downloadable solution.

Figure 9:
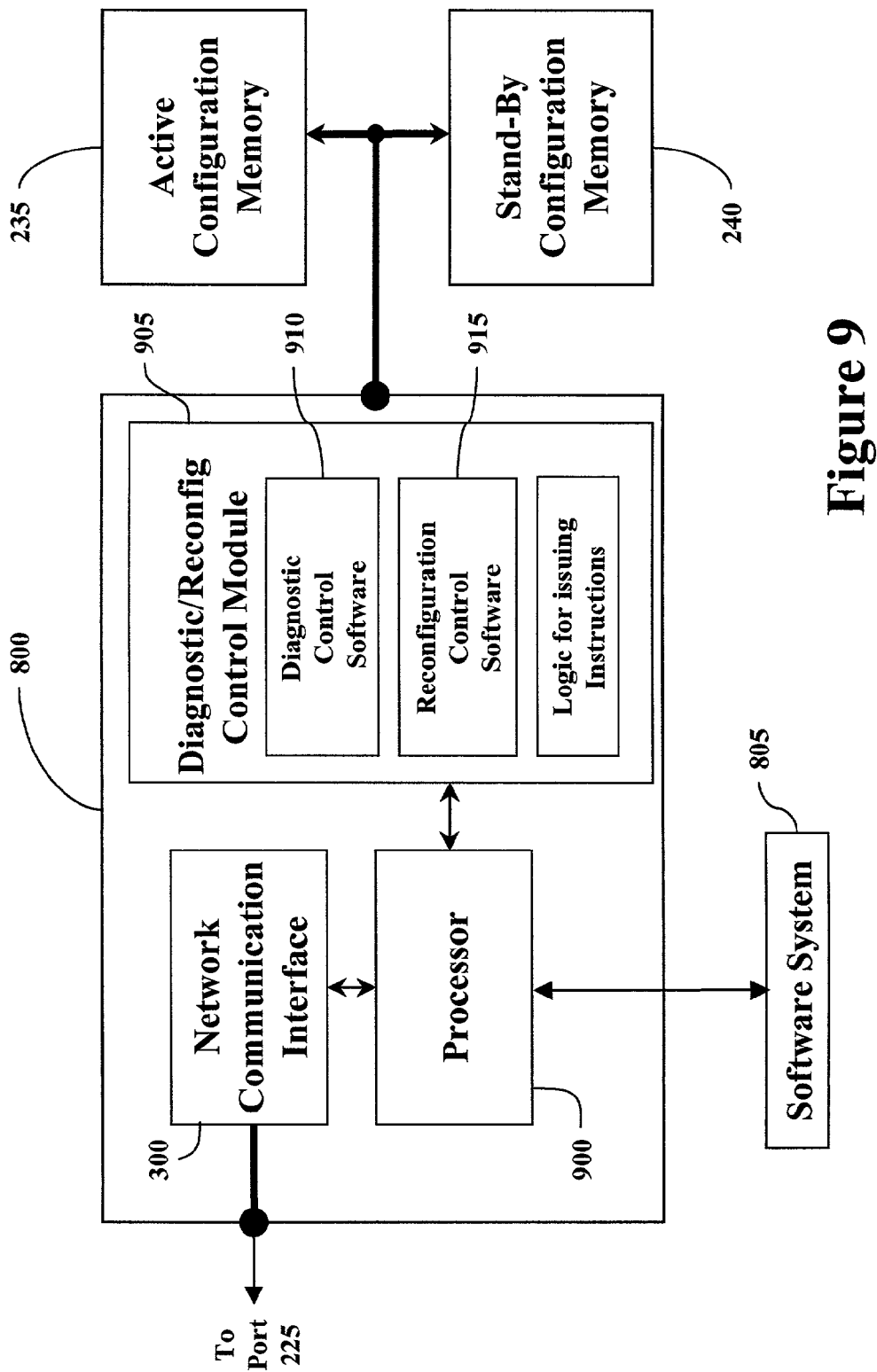
FIG. 9 is an exemplary microcontroller of FIG. 8.

Illustrated in FIG. 9 is an exemplary detailed diagram of the diagnostic microcontroller 800 embedded in the electronic device 100. Similar to the previous embodiment, the microcontroller includes the network communication interface 300 to communicate to the diagnostic center 120 using network communication protocols as known in the art. A processing unit 900 is programmed to control the operations and data communications between the components of the microcontroller and the electronic device, in particular between the software system 805.

The microcontroller 800 includes a diagnostic/reconfiguration control module 905 which includes diagnostic control software 910 and reconfiguration control software 915. The diagnostic/reconfiguration control module 905 is similar to the control module 310 discussed previously except it operates to control diagnostics of the software system 805 instead of a programmable logic device. It will be appreciated that the control module can be configured to diagnose and communicate with both hardware and software components of the electronic device 100. The diagnostic control software 910 includes logic that controls diagnostic processes performed on selected components of the software system 805. This includes logic that issues instructions to the software system to perform desired actions. The reconfiguration control software 915 includes logic that controls reconfiguration processes performed on selected components of the software system as described in greater detail below.

With further reference to FIG. 9, the active configuration memory 235 and the stand-by configuration memory 240 are the same as described above. When software or other data is transmitted to the microcontroller 800 over the network, the data is loaded into the stand-by configuration memory 240. Once it is verified that the data has been transferred completely and correctly and ready for use by the microcontroller, the data is moved to the active configuration memory 235.

Figure 10:
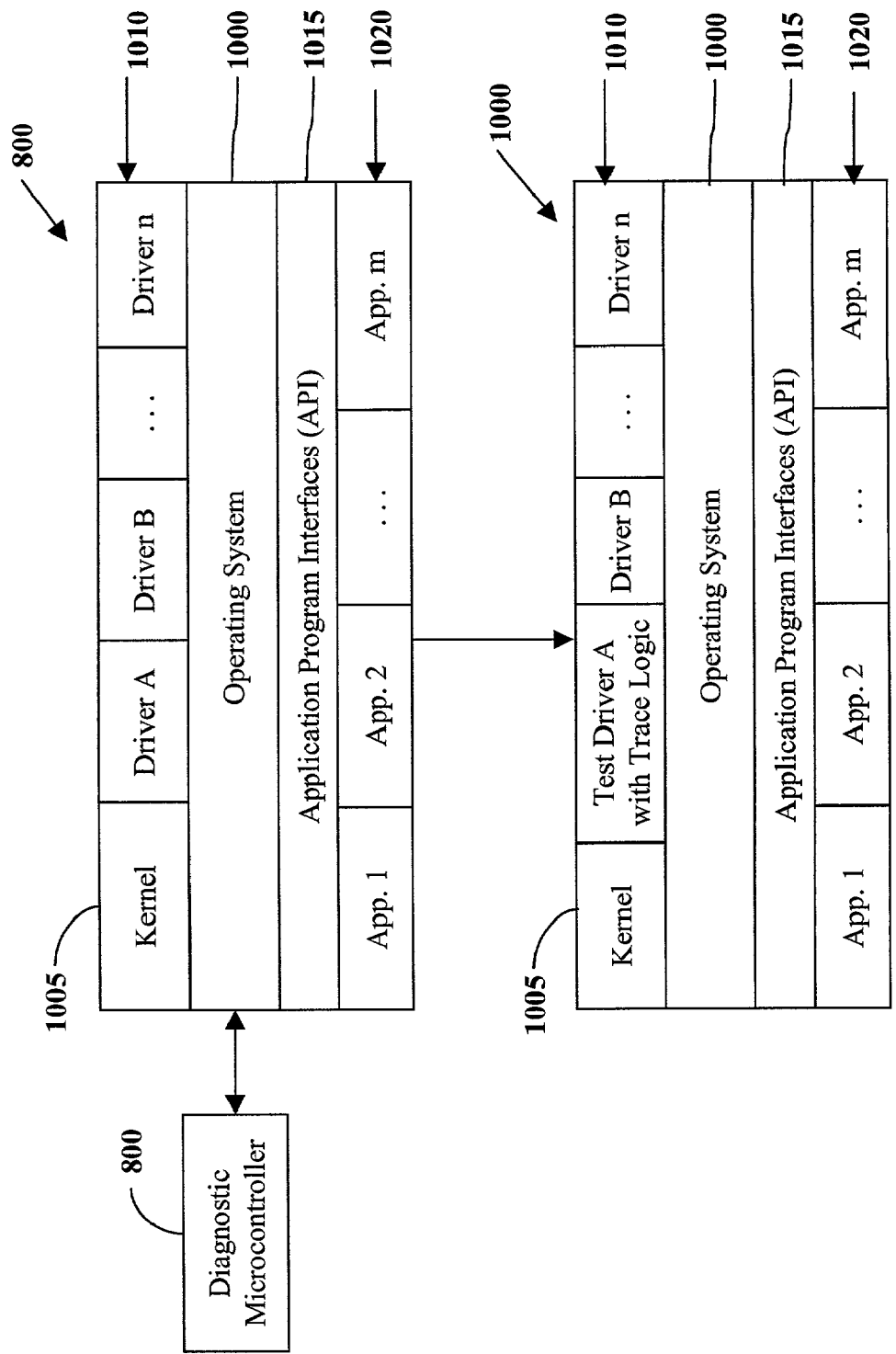
FIG. 10 is an exemplary diagram of a software system.

Illustrated in FIG. 10 is an exemplary diagram showing various components of the software system 805. The software system includes, for example, an operating system 1000. This is low-level software that handles the interface to peripheral hardware, schedules tasks, allocates storage, and operates other low-level functions of the device as known in the art. Of course, the duties of the operating system are dependent on how it is configured and the type of electronic device it executes in. A kernel 1005 is an operating system component responsible for memory management, responding to interrupts and exceptions, scheduling execution threads, synchronizing activities of multiple processors or applications, hardware interfaces, security and other critical functions as known in the art. As will be appreciated by one of ordinary skill in the art, the duties of the kernel, if even present, are dependent on how it is configured and the type of electronic device it executes in.

In one embodiment, the software system 805 include one or more drivers 1010 (Driver A–Driver n). A driver is software that controls a component or peripheral device of a system such as memory, hard disk drive, printer, or other components that are present or associated with the electronic device as is known in the art. The drivers, for example, provide other device services to application programs and the operating system. These may include input/output control drivers, display drivers, interrupt control, Ethernet/USB line controller, peripheral services, infrared port control, power management, security functions, communications drivers, etc. as is known in the art.

Also illustrated in the exemplary software system 805 in FIG. 10 are one or more application program interfaces (API) 1015. These interfaces provide the means for the application programs 1020 (Applications 1-m) to access the operating system 1000 and other services of the software system 805. It will be appreciated that the above definitions are for exemplary purposes only and are not intended to change the ordinary meaning of software system components or limit the types of components that exist in a particular electronic device.

With further reference to FIG. 10, a brief description of software diagnosis is provided in accordance with the present invention. In the following example, Driver A is used as the software component isolated for diagnosis.

After observing the behavior of the software system 805 and/or other behaviors of the electronic device, the diagnostic/repair center 120, for example, determines that Driver A may not be functioning properly. To diagnose the problem, a Test Driver A is transmitted over the network 115 to the electronic device and replaces Driver A. This state of the software system is shown as 1025. Test Driver A is selected because it has equivalent operating characteristics as Driver A, but also included data collection functions also known as trace logic. To the electronic device 100, it operates as if Driver A is still present.

As the electronic device operates, Test Driver A collects data of the operation including input and output signals/instructions transmitted between the components of the software system 805 and Test Driver A. The operational data is stored in a diagnostics file and transmitted back to the diagnostic/repair center 120 where it is analyzed by the analysis routine(s) 815 and by a technician if desired. Based on the analysis, a course of action is determined and a corrective measure is recommended. This may include identifying a defect in Driver A and replacing it with an available upgraded version, performing additional diagnostic tests, identifying a problem that is not repairable over the network, or other course of action depending on the particular situation.

Figure 11:
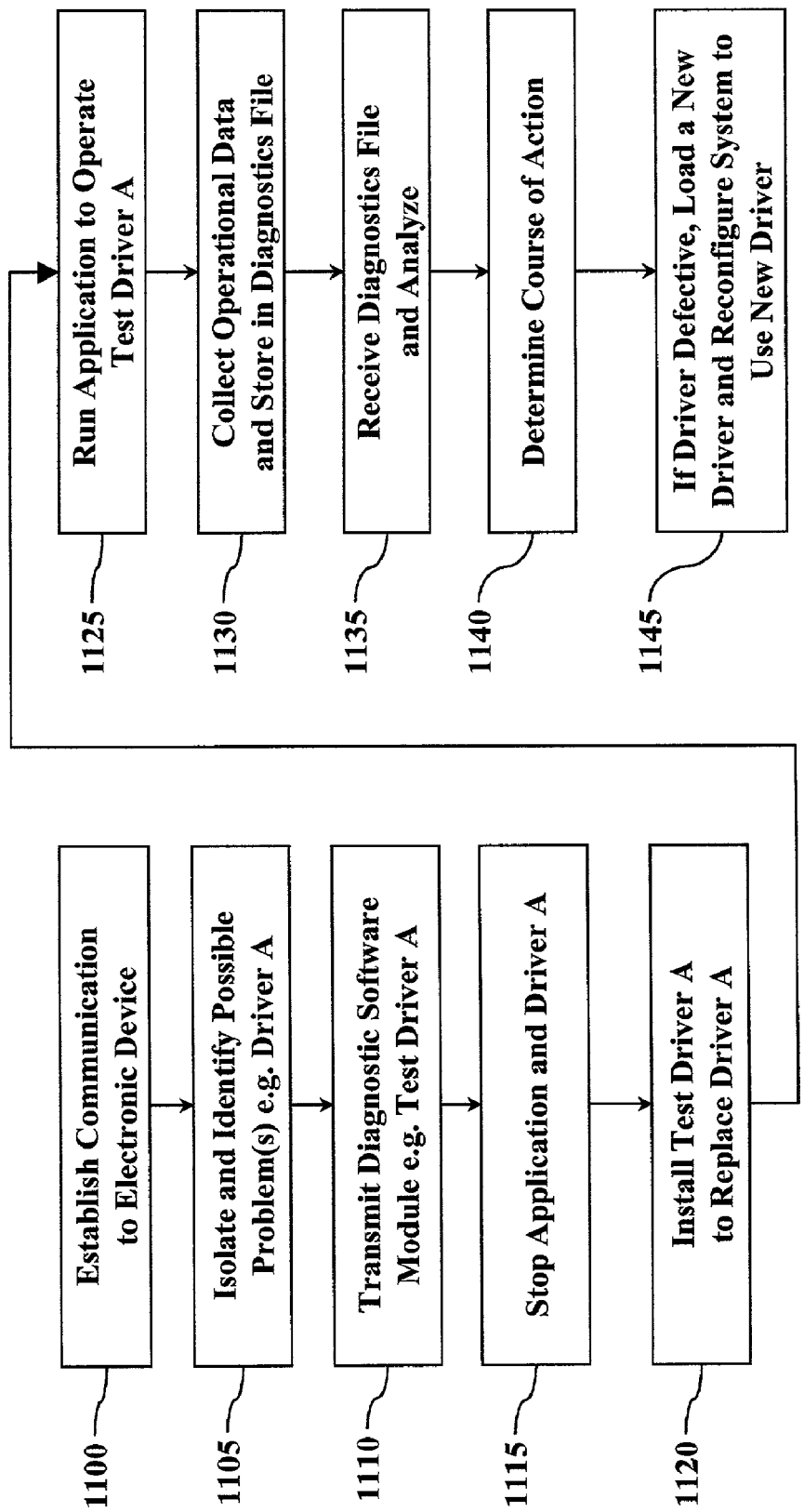
FIG. 11 is an exemplary methodology of diagnosing the software system in accordance with the present invention.

Illustrated in FIG. 11 is an exemplary methodology of the system shown in FIG. 8 for diagnosing the software system 805 of the electronic device 100, and if appropriate, reconfiguring selected software components therein. As illustrated, the blocks represent functions, actions and/or events performed therein. It will be appreciated that electronic and software applications involve dynamic and flexible processes such that the illustrated blocks can be performed in other sequences different than the one shown. It will also be appreciated by one of ordinary skill in the art that elements embodied as software may be implemented using various programming approaches such as procedural, object oriented or artificial intelligence techniques.

With reference to FIG. 11, when a user believes their electronic device 100 may not be functioning properly, the electronic device is connected to the network 115 and communication is established with the diagnostic/repair center 120 (block 1100). Once connected, the diagnostic/repair center 120 attempts to isolate and identify possible problems with the system software 805 based on observed behavior and information from the user, if any (block 1105). For exemplary purposes, we use Driver A as the isolated software component. The software component is further identified by information such as its name, version number, the electronic device 100 it operates on, and other information as necessary. The diagnostic/repair center 120 searches the database of diagnostic components 810 to determine if a corresponding diagnostic software component exists for Driver A. The corresponding diagnostic software component has the same operational characteristics as the original software component and emulates its functionality. In other words, it includes the identical software code as the original software component. Additionally, the diagnostic component includes trace logic to collect operational data while running on the software system 805. For this discussion, the diagnostic software component is named Test Driver A.

With further reference to FIG. 11, Test Driver A is transmitted by the diagnostic/repair center 120 to the diagnostic microcontroller 800 of the electronic device 100 (block 1110). In the microcontroller 800, the diagnostic control software 910 issues instructions to the operating system 1000 to stop Driver A and any running applications (block 1115). With further issued instructions, Test Driver A is installed in the software system 805 and replaces Driver A (1120). If necessary, the system registry is reconfigured to identify the new resource (Test Driver A).

The diagnostic control software 910 then instructs the operating system 1000 to begin execution of the application(s) that were stopped which will now operate with Test Driver A (block 1125). During the operation of the application(s) and the electronic device overall, the trace logic of Test Driver A collects operational data and stores the data in a diagnostics file (block 1130). The operational data includes signals transmitted from and received by the Test Driver A to the other software components. Data collection is performed for a desired time period and the diagnostics file is transmitted to the diagnostic/repair center 120. When received, the diagnostics file is analyzed by the analysis routines 815 to identify the operational characteristics of the system, any suspect behavior, and any possible defects in the driver, the application software or other component in the software system 805 (block 1135). Based on the analysis, the diagnostic/repair center 120 determines a course of action to correct any identified problems (block 1140).

Possible problems may be as follows. Since Test Driver A is equivalent to original Driver A plus trace logic, if there is a bug or other defect in the code of the Driver A, the Test Driver A will also have the bug or defect. If a problem exists in the operational functionality between components (e.g. between the Driver and other components), the trace logic records the sequence of instructions and signals passed therebetween that is then analyzed. When properly functioning, the sequence of instructions and/or signals passed between components is known. For example, based on a certain set of inputs, a certain set of outputs are expected in response. If the outputs are different than expected, a possible problem or defect exists. This analysis is involved in isolating a selected software component while the software system 805 executes using an installed diagnostic software component (Test Driver A) (block 1125). The diagnostic software component also includes a protective mode that when certain inputs are received by the Test Driver A, they are not passed on to the device if it is believed there is a possibility of damaging the device if the associated operation is performed.

Another problem can occur in the application software that communicates with the Test Driver A due to an exceptional run-time condition that initiates an improper sequence of instructions. The collected instructions and responses, as part of the analysis, can be matched to a database of expected signals 825 for known software components. If an unexpected sequence of signals is observed, the diagnostic/repair center 120 attempts to retrieve an associated corrective software from database 830, if one exists. The corrective software may take many different forms including upgrade code for the defective software, complete replacement code, or other instructions for correcting the software. The corrective software is then transmitted to the microcontroller 800 where the reconfiguration control software 915 initiates replacement of the defective software with the corrective software by issuing instructions to the operating system.

In particular, if it is determined that Driver A is defective and an associated corrective software 830 exists for Driver A (e.g. a new version of Driver A), the new driver is installed into the software system 805 and the system is reconfigured to use the new driver (block 1145). Alternately, if corrective software is not available for the particular defect, the diagnostic/repair center 120 can load a special driver into the software system 805 to stop its operation to force the user to send the electronic device 100 to a repair center.

The diagnostic/repair center 120 can perform a diagnosis in different ways. For example, it may download a driver, install it in the software system 805, and remove the driver when the diagnostics are completed. Alternately, a driver is downloaded, installed, and left in the software system after diagnosis. Another embodiment includes having test drivers and other diagnostic software components pre-loaded into the electronic device 100 where they are accessible by the diagnostic control software 910 to perform diagnostic tests when desired.

In another embodiment, the diagnostic control software 315 and 910 are combined so that the diagnostic microcontroller can perform both hardware and software diagnostics and reconfiguration as described above. To this end, the diagnostic center includes logic for issuing reconfiguration instructions 835 causing the electronic device to reconfigure characteristics of a hardware component therein to affect the operation of the software system. For example, selected hardware components can be reconfigured to speed up their processing (e.g. increase clock speed) which may in turn assist in identifying or bring out certain errors in the software system 805 when trying to process signals at the increased speeds.

With the present invention, test software components are used to simulate the input and outputs of a selected software component as it operates with the system software. Different software components rely on different inputs and outputs. Knowing this, a diagnostic component can initiate instructions to try to isolate the behavior of selected subsystems in the software. A diagnostic component can also use the functions and capabilities of one software component to test another software component by driving certain inputs to the software component.

With the present invention, a remote electronic device can be diagnosed and, if possible, reconfigured to correct errors over a communications network. This eliminates the inconvenience of physically sending the electronic device for diagnosis and servicing in certain circumstances.

It will be appreciated that aspects of the present invention that may be implemented in software can be implemented in other ways than the illustrated embodiments. The software can also be maintained in different computer readable forms such as on a magnetic storage medium, digital medium, stored in memory, and other forms as is known in the art.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art.

For example, the diagnostic microcontroller 105 and 800 can include analysis capabilities to analyze diagnostic output results. In another embodiment, the diagnostic microcontroller 105 and 800 and associated communication architecture may be formed as a device separate from the electronic device rather than being embedded therein. In this manner, the present invention may be externally connected to pre-existing electronic devices. Another embodiment includes reconfiguring a programmable logic device within the electronic device to act as the diagnostic microcontroller. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A diagnostic system for diagnosing a software system operating within a remote electronic device where the software system includes one or more software components, the diagnostic system comprising:
    a network communication interface that establishes communication to the remote electronic device;
    a diagnostic controller for controlling diagnostics of the software system, the diagnostic controller instructing the remote electronic device to replace a selected software component of the software system with a diagnostic software component being transmitted to the remote device via the network communication interface;
    the diagnostic software component having equivalent operational characteristics as the selected software component and including trace logic that collects diagnostic data while operating with the software system; and
    an analysis routine that analyzes the diagnostic data and recommends a corrective measure for the software system.

2. The diagnostic system as set forth in claim 1 further including:
    a database of diagnostic software components; and
    search logic for identifying one of the diagnostic software components from the database that has equivalent operational characteristics as the selected software component.

3. The diagnostic system as set forth in claim 1 wherein the analysis routine includes search logic for matching one or more portions of the diagnostic data to one or more expected data stored in a database of expected data.

4. The diagnostic system as set forth in claim 3 wherein the diagnostic data includes input signals received by the diagnostic software component from the software system and output signals transmitted by the diagnostic software component during the operation of the electronic device.

5. The diagnostic system as set forth in claim 4 wherein the database of expected data includes, for a certain type of software component, a sequence of input signals and a corresponding sequence of output signals that are expected for a properly functioning software component.

6. The diagnostic system as set forth in claim 1 wherein the diagnostic controller is a computer programmed to control the diagnostics of the software system over a network.

7. The diagnostic system as set forth in claim 1 further including a database of corrective software components.

8. The diagnostic system as set forth in claim 1 wherein the diagnostic controller further includes logic for issuing reconfiguration instructions causing the electronic device to reconfigure characteristics of a hardware component therein to affect the operation of the software system.

9. An electronic device having one or more software components that operate within the electronic device, the electronic device comprising:
    a diagnostic microcontroller, embedded within the electronic device, that controls a diagnostic test performed on a selected software component within the electronic device, the diagnostic microcontroller including logic for replacing the selected software component with a test software component that emulates the selected software component such that the electronic device operates with the test software component;
    the test software component further including trace logic that collects operational data during the operation of the electronic device; and
    a network communication interface that transmits the operational data to a remote diagnostic computer to analyze the operational data for errors.

10. The electronic device as set forth in claim 9 wherein one of the software components is an operating system, and the diagnostic controller further includes logic for issuing operating system instructions to cease execution of the selected software component before being replaced.

11. The electronic device as set forth in claim 9 wherein one of the software components is a device driver.

12. The electronic device as set forth in claim 9 wherein one of the software components is application program.

13. The electronic device as set forth in claim 9 further including reconfiguration control software to reconfigure the electronic device to operate with the test software component.

14. The electronic device as set forth in claim 13 wherein the reconfiguration control software includes logic for reconfiguring operational characteristics of a hardware component within the electronic device to affect the operation of the software components.

15. The electronic device as set forth in claim 9 further including a memory for receiving the test component software from the remote diagnostic computer.

16. A process of diagnosing a software system within a remote electronic device where the software system includes one or more software components, the process comprising the steps of:
- transmitting a diagnostic software component to the remote electronic device that emulates operational characteristics of a software component within the software system;
- instructing the electronic device to operate with the diagnostic software component in place of the software component;
- collecting, with the diagnostic software component, operational data transmitted between the diagnostic software component and other components of the electric device; and
- receiving and analyzing the operational data from the electronic device to diagnose defects in the software system.

17. The process of diagnosing as set forth in claim 16 further including identifying the diagnostic software component that corresponds to the software component from a database of diagnostic software components.

18. The process of diagnosing as set forth in claim 16 further including instructing the software system to install the diagnostic software component in place of the software component.

19. The process of diagnosing as set forth in claim 16 wherein the diagnostic software is transmitted from a diagnostic computer over a network to the remote electronic device.

20. The process of diagnosing as set forth in claim 16 wherein the software component is selected by isolating a possible defect in the software system based on observed behaviors of the electronic device.

* * * * *